United States Patent Office 2,785,447
Patented Mar. 19, 1957

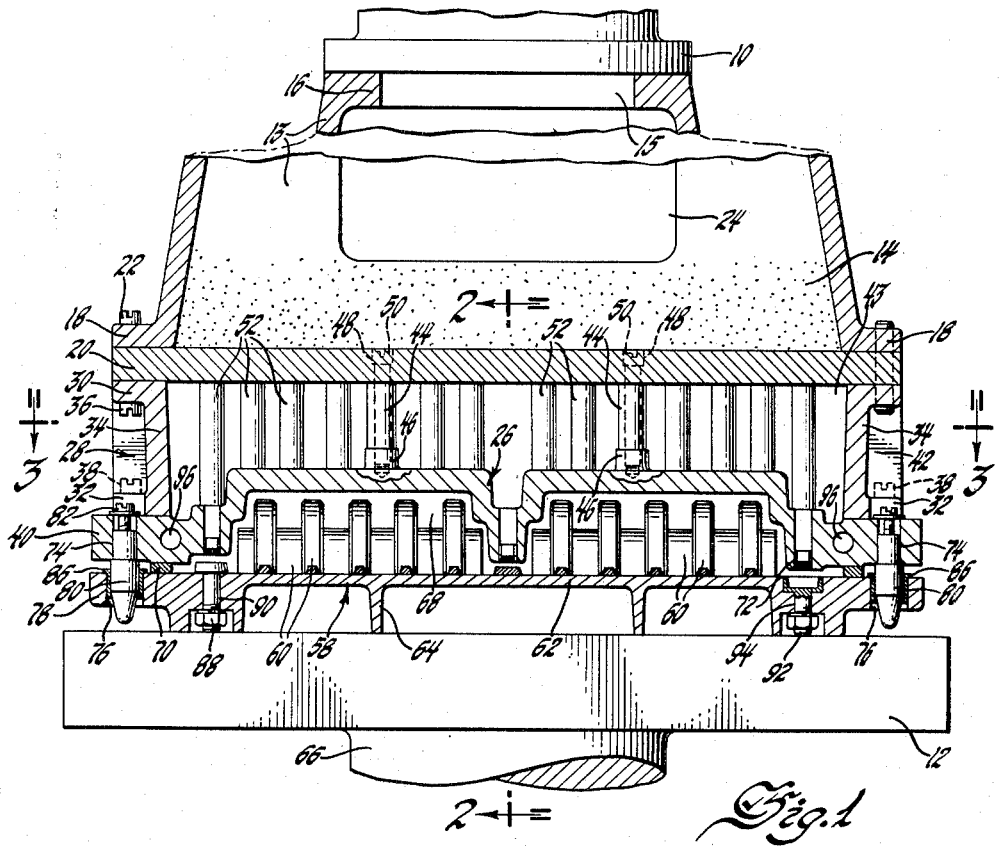

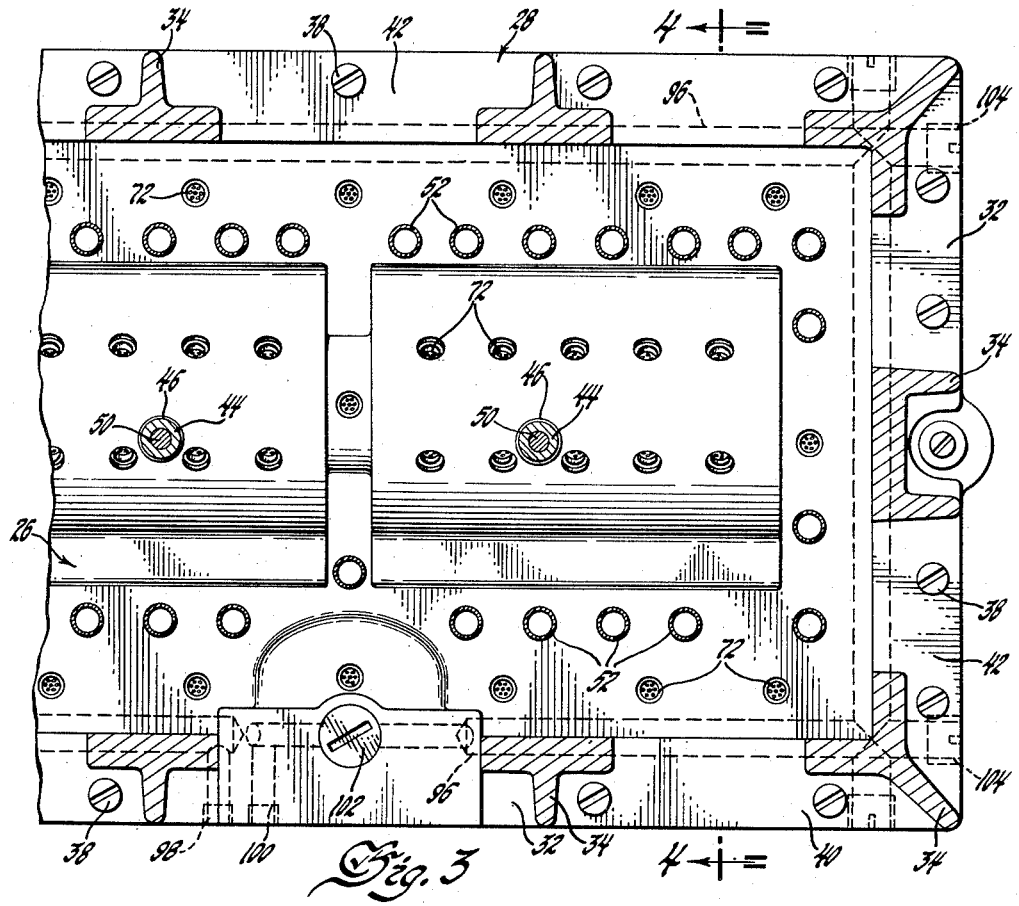
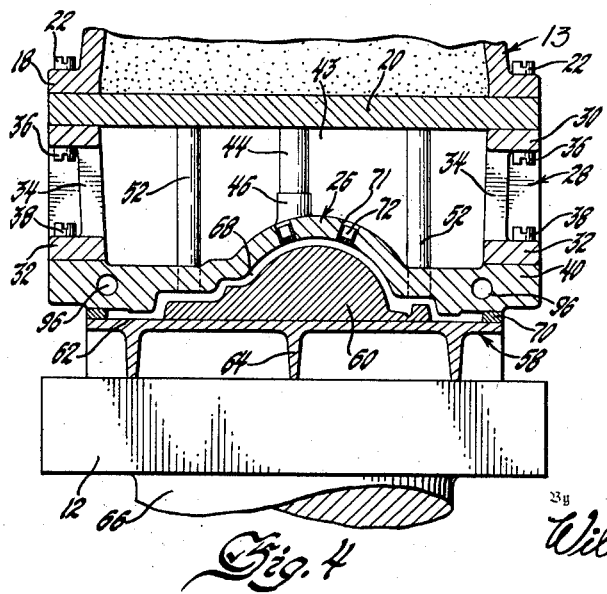

2,785,447

MACHINE AND PROCESS FOR FORMING SHELL MOLDS

Arthur J. Anderson, Bedford, Ind., assignor to General Motors Corporation, Detroit, Mich., a corporation of Delaware Application September 26, 1951, Serial No. 248,424

7 Claims. (Cl. 22—36)

This invention relates to the forming of sand molds for metal casting operations and particularly to a machine and process for forming shell-type sand-resin molds.

Recently developed techniques in foundry practice employ thin-walled dispensable molds and cores composed of sand and plastic binders. These procedures, frequently generally referred to as "shell molding" processes, are particularly suited for the production of precision casings in a wide variety of metals.

A principal object of this invention is to provide an inexpensive machine for rapidly, and conveniently forming shell-type sand-resin molds for high production use.

Another object of the invention is to provide a mold blowing machine and process which permit the formation of accurate shell molds for precision casting and which to a great extent eliminate the need for manual handling with its attendant danger of mold breakage.

Essentially, the shell molding process consists of using a thermosetting plastic or resin as a binder for the sand grains to form rigid molds having high gas permeability, good surface smoothness and dimensional stability. The molding material, which is generally a dry mixture of a major proportion of silica sand and a minor proportion of a plastic binder, is used in powdered form with no water being added. Phenol formaldehyde and melamine formaldehyde resins are typical examples of the type of thermosetting binders preferably used. The sand employed is preferably free of metal oxides, clay, moisture and organic matter.

These sand-resin molds are prepared by allowing the dry mixture of sand and resin powder to come into contact with a hot metal pattern for a short period of time. A layer of the mix adheres to the metal surfaces due to the heating of the resin which entraps the sand with which it is intimately mixed, thereby accurately reproducing pattern details. Metal patterns must be employed because they are subjected to elevated temperatures. Pattern temperatures in the range between 250° F. and 350° F. are typical, but temperatures up to 600° F. may be advantageously employed under particular conditions. The half patterns, gate and runner are usually all permanently fixed on metal plates. The pattern temperatures and the length of time the molding material is allowed to remain in contact with the hot pattern surfaces determine the resulting thickness of the mold. Mold build-up times ranging from a few seconds to approximately one minute are appropriate for various applications.

After this short time interval, the excess dry sand and resin are removed, and the closely adhering sand-resin layer is preferably cured by heating to a temperature within the range of approximately 300° F. to 600° F. for a short period of time, usually from a few seconds to five minutes, while in contact with the metal pattern.

The baking operation results in the conversion of the resinous material to a hard insoluble binder which securely bonds the sand grains together. The formed molds are, in effect, thin shells which have sufficient strength and stiffness to make them suitable for many casting operations. After the removal of the pattern and mold from the curing oven, the mold is stripped from the pattern.

It will be understood that the term "mold," as used herein, is generally applied in its generic sense to mean a casting form which includes both molds and cores, this invention in no manner being limited to the former. Similarly, unless otherwise indicated, the word "pattern" is used herein as including both mold patterns and core boxes.

Other objects and advantages of this invention will more fully appear from the following description of a preferred embodiment of the invention shown in the accompanying drawings, in which:

Figure 1 is a vertical sectional view, with parts broken away, of the mold forming machine embodying the invention;

Figure 2 is a sectional view along the line 2—2 of Figure 1, showing the blowhead assembly portion of the mold forming machine;

Figure 3 is an enlarged horizontal sectional view along the line 3—3 of Figure 1, showing parts of the blowhead assembly; and Figure 4 is a sectional view of the assembly along the line 4—4 of Figure 3.

Referring more particularly to the drawings, Figure 1 shows a blowhead assembly embodying the invention positioned between a traverse mechanism 10 and a pattern rest table 12 of a conventional core blowing machine. An upwardly tapered magazine 13 for containing a sand-resin molding mixture 14 of the type hereinbefore described is shown as located beneath the traverse 10 of the blowing machine, this magazine preferably being constructed of a pair of channel-shaped castings of aluminum or other suitable metals which are bolted together along vertical flanges, not shown. The magazine has its upper end provided with an opening 15 through which the sand-resin mix and compressed air may be introduced into the magazine through the abutting portion of the traverse mechanism. Inwardly extending flanges 16 are shown as formed around the magazine opening 15 and may be fastened to the traverse mechanism by bolts or other suitable means.

The bottom of the magazine is shown as provided with outwardly extending flanges 18, which are secured to a horizontal metallic plate 20 by screws or studs 22. The plate 20 functions as the upper wall of the blowhead assembly and as the lower wall of the magazine. A suitable quantity of the sand-resin mixture 14 is contained in the magazine prior to the actual blowing operation. The front wall of the magazine is preferably provided with a cleanout opening 24, which may be closed by a removable plate, not shown, to facilitate any periodic cleaning of the sand-resin molding mixture from the magazine.

A blowhead 26, which is actually a female pattern plate for the mold, is secured beneath the plate 20, and is spatially separated therefrom by a spacer or air escape frame, indicated generally by 28. This frame is shown as including a pair of rectangular flange portions 30 and 32 which abut the adjacent surfaces of the plate 20 and the blowhead 26, respectively, near the outer edges thereof. These flange portions are connected by vertically extending supporting or spacing struts 34, the flanges 30 being secured to the plate 20 by screws 36 or other suitable means, and the flanges 32 in turn being similarly attached, as by screws 38, to the flat edge portions 40 of the blowhead plate 26. This construction provides the blowhead assembly with a high degree of structural rigidity and, at the same time, provides openings 42 between the vertical supporting struts 34. These openings function as air escape ports to permit the air which is displaced by the sand-resin mix during the blowing operation to pass from the space 43 in the blowhead assembly to the atmosphere.

A pair of tubular vertical supports 44 are shown as extending from the lower surface of the plate 20 to engage the upper ends of annular flanges or lugs 46 formed on the upper surface of the blowhead 26. Openings 48 drilled in the plate 20 provide for the admission of machine screws 50, which extend through the tubular supports 44. These screws threadedly engage the lugs 46 to maintain the supports 44 in assembled portion and provide additional rigidity to the blowhead assembly. This construction is desirable to prevent any possible distortion of the portion of the blowhead plate 26 which is adjacent the very hot pattern on which the shell mold is formed and which comes into contact with the heated sand-resin mixture.

As best shown in Figure 2, a plurality of blow tubes 52, which are preferably made of steel tubing, also interconnect and extend through the plate 20 and the blowhead 26. The upper ends of the blow tubes are press fitted into apertures 54 which are drilled and countersunk in the plate 20, while the lower ends of the blow tubes are similarly fitted into openings 56 drilled in the blowhead. The blow tubes function to conduct the sand-resin molding mix from the magazine to the mold-forming cavity formed between the blowhead and the metallic pattern plate, indicated generally by 58, these tubes being located at appropriate positions to allow for the proper distribution of the molding mix. The distribution of the blow tubes, which is dependent upon the shape of the castings to be ultimately formed, may be best seen in Figure 3.

It should be noted that the blow tubes 52 enter the cavity between the blowhead and the pattern through the unheated blowhead, thereby precluding the possibility of the sand-resin molding material fusing within these tubes and obstructing the passage of fresh molding mix therethrough. In order to further aid in preventing plugging of the blow tubes with the molding material, the openings extending through these tubes are preferably upwardly tapered.

The pattern 58 is shown as seated on the pattern rest table 12. This pattern is preferably formed of two portions, a mold-contacting or molding face portion 60 and a flat base portion 62. The base of the pattern may be constructed integral with the molding face portion or formed separately and attached thereto, as desired. In the modification of the pattern plate shown, the pattern base is provided with downwardly extending supporting flanges 64, which lend the necessary structural rigidity to the pattern under the severe operating conditions, such as high temperatures, to which it is subjected. These flanges also serve to facilitate heating of the pattern before it is introduced into the blowhead assembly and to permit proper cooling of the mold after the pattern is removed from the blowing machine and the mold cured.

A vertically movable shaft or piston 66, which is hydraulically or otherwise suitably actuated, supports the pattern table 12 and functions as a lift to move the table and pattern into and out of operating position beneath the blowhead. When the mold pattern 58 is moved upwardly on the pattern rest table into assembled position beneath the blowhead 26, there is provided a cavity 68 between the pattern 58 and the blowhead. The size of this cavity is preferably designed so as to regulate the ultimate thickness of the sand-resin mold desired.

In the modification of the invention shown in the drawings, metallic spacer strips 70, which determine the thickness of the mold to be formed, are shown as being provided interjacent the pattern and the blowhead. These strips are preferably secured to the pattern plate and, when so secured, constitute the only portions of the pattern assembly which contact the blowhead upon closure of the pattern and blowhead before the sand-resin molding mix is blown. It will be understood, however, that the strips 70 could also be formed integral with either the blowhead or the pattern plate.

The blowhead plate 26, which is preferably made of either aluminum or a ferrous metal, is provided with a plurality of air outlet openings 71 to provide an escape path for the air displaced from the cavity 68 and the blow tubes. As is shown in the drawings, each of these air outlet openings contains a cup-shaped insert 72 which is provided with small venting holes. The cross-sectional area of these latter holes is sufficiently small to eliminate the possibility of sand grains passing therethrough, thereby preventing the molding material from passing out of the cavity 68 during the blowing operation.

Openings 74 and 76 are provided in the flat end portions 40 and 78 of the blowhead plate and pattern base, respectively, to provide for locating pins or aligning plugs 80. The tapered lower end portions of these pins, which are shown as attached to the blowhead plate 26 by screws 82, extend into the openings 76 in the pattern base when the blowhead and pattern are in assembled position. Replaceable metal bushings 86 are provided in these latter openings to prevent excessive wear of the pattern base and to provide for correct alignment of the openings with the locating pins.

A pair of nut and bolt assemblies 88 are shown as provided in drilled vertical openings 90 near one end of the blowhead base and another pair of nut and bolt assemblies 92 are shown as provided in openings 94 near the other end of the blowhead base. It will be seen from Figure 1 that in the modification of the pattern shown, the bolt assemblies 88 have their bolt heads protruding upwardly beyond the upper surface of the pattern base, while the bolt assemblies 92 have recessed heads which are set into the pattern base. This construction is desirable when the same pattern is used to form mating mold halves in order that the aligning protrusions and recesses thereby formed on the mold shells may mate with one another when one of the mold halves is reversed with respect to the other mold half and placed in contact therewith to form the final shell mold assembly. In this manner, perfect alignment and engagement is provided between the mold halves during the pouring of the molten casting metal.

A coolant passage 96 is provided within the blowhead 26 near its outer edges and extends completely around the blowhead in the vicinity of the metallic spacer strips 70. This coolant passage is provided with an inlet duct 98 and an outlet duct 100, the rate of flow of the fluid coolant employed being regulated by a needle valve 102 in the passage. Drilling or sealing plugs 104 are provided in the ends of the passage segments to prevent the escape of the coolant. The coolant passages are preferably located adjacent the inner edges of the spacer strips 70 so as to prevent the complete melting and setting of the resinous binder at the very junction of the lower surface of the blowhead and the inner side faces of the strips. Such an arrangement prevents the hot shell mold from adhering too tightly to these corner surfaces and thereby reduces the danger of tearing the mold at these points when the mold is subsequently stripped from the pattern. If the spacer strips are secured to the blowhead, this problem of mold tearing would otherwise be quite troublesome. Water, air or other suitable coolants may be employed for this purpose.

The sequence of operation of the shell mold forming machine is as follows. The heated metal pattern plate 58 is first placed in position on the pattern rest table 12. This is preferably done while the blowhead assembly, which may be supported by any suitable frame structure, is removed from between the traverse mechanism 10 and the pattern rest table 12 and while the magazine is in loading position under a hopper, not shown, containing the dry sand-resin molding mixture to be used. The magazine portion 14 of the blowhead assembly is filled with a suitable amount of the molding material, and the assembly is then laterally moved into position directly under the air supply means. Both the hopper which contains the molding media and the air supply means may be rigidly mounted on the same frame on which the blowhead assembly is slidably secured.

After the blowhead assembly is in its proper position immediately beneath the air supply means and above the pattern rest table 12, the pattern table is elevated by the vertically movable piston 66 to permit the upper faces of the spacer strips 70 to contact the lower surface of the blowhead 26.

When the pattern table, blowhead assembly and air supply means are in assembled position, air is fed into the magazine through opening 15 in its top wall. This air, which is preferably introduced under approximately 90 pounds per square inch pressure, forces the dry sand-resin molding mix through the blow tubes 52 and into the mold cavity 68 between the hot pattern and the blowhead. In the arrangement shown, the air is not intermixed with the molding material as the latter enters the cavity 68, but instead the compressed air functions as a ram to drive the sand-resin mix into this cavity. The air which is displaced from the mold cavity is forced upwardly through the air vents 71 in the blowhead and into the space 43 between the plate 20 and the blowhead 26. This displaced air then escapes through the air escape ports 42 formed between the spacing struts 34 and out of the blowhead assembly.

Following the blowing operation, a time interval is allowed for the thermosetting resin binder to "set" on the hot pattern, a period of time ranging from a few seconds to approximately one minute being appropriate for various applications, a mold build-up in the order of about 10 seconds usually being sufficient. After the resin has set, the table is lowered and the blowhead returned to its position immediately beneath the hopper. The metal pattern plate 58 is then removed from the rest table and, if desired, the closely adhering sand-resin layer is baked for a short period of time, usually from a few seconds to five minutes in a curing oven while in contact with the pattern. After the removal of the pattern and the formed mold from the curing oven, the mold is stripped from the pattern, thus completing the operating cycle.

The magazine 13 is preferably designed to contain more sand-resin mix than is necessary for the formation of one mold, it being desirable in most instances to form this magazine of sufficient size to permit it to remain beneath the air supply means for a multiplicity of shots.

Various modifications in the arrangement and details of the specific embodiment described and shown herein will be apparent to those skilled in the art and are contemplated as within the scope of the present invention as defined in the claims appended hereto.

I claim:

1. An apparatus for forming shell molds comprising a magazine for containing a molding mixture comprising sand and a thermosetting resin binder, an unheated metal female pattern plate secured to and spatially separated from the outlet end of said magazine, said female pattern plate having concave lower mold-defining surfaces, a heated metal male pattern plate provided with convex upper mold-defining surfaces having a contour generally similar to the contour of said concave mold-defining surfaces located beneath said female pattern plate, means for moving at least one of said pattern plates into proximity to the other of said plates to form a mold-defining cavity therebetween, ducts extending from said magazine through said female pattern plate for conveying said molding mixture from said magazine to said cavity, air vents in one of said pattern plates for permitting the escape of air displaced from said cavity, said convex mold-defining surfaces extending upward into the space defined by said concave mold-defining surfaces when said plates are in said cavity-forming position, the distance between said concave and convex surfaces when said plates are in said cavity-forming position not exceeding the thickness of the thin-walled shell mold which is formed between said surfaces after the sand in said mold has been bonded by said resin, and means for moving at least one of said pattern plates out of proximity to the other of said plates to permit the removal of said shell mold from said cavity.

2. An apparatus for forming thin-walled shell molds comprising a magazine for containing a molding mixture comprising sand and a thermosetting binder, an unheated blowhead plate connected to the outlet end of said magazine, a heated pattern plate located adjacent said blowhead plate, said pattern plate and blowhead plate being relatively movable into proximity to one another to form a mold-defining cavity therebetween, a plurality of ducts extending from said magazine through said blowhead plate to said cavity for conveying said molding mixture thereto, one of said plates having inwardly extending molding surfaces, the other of said plates being provided with outwardly extending molding surfaces having a contour generally similar to the contour of said inwardly extending molding surfaces, said outwardly extending molding surfaces projecting into the space defined by said inwardly extending molding surfaces when said pattern and said blowhead are moved into mold-forming position, the distance between said outwardly extending molding surfaces and said inwardly extending molding surfaces when said pattern plate and said blowhead plate are in said mold-forming position not exceeding the thickness of the thin-walled shell mold which is formed between said surfaces after the sand in said mold has been bonded by said binder, and a plurality of vents extending from said cavity to the atmosphere to permit the escape of air displaced from said cavity by said mixture.

3. An apparatus for forming thin-walled shell molds comprising a magazine for containing a molding mixture of sand and a thermosetting resin binder, an unheated metal blowhead having concave lower mold-defining surfaces connected to the lower outlet end of said magazine, a vertically reciprocable pattern rest table located beneath said blowhead, a heated metal pattern positioned on said table and movable upward therewith into a position wherein surfaces of said pattern near the edges thereof contact said blowhead near the edges thereof to form a mold-defining cavity between said pattern and said blowhead, a plurality of ducts extending from said magazine through said blowhead into said cavity for conveying said molding mixture thereto, means for blowing said mixture from said magazine through said ducts into said cavity, said heated pattern being provided with upper convex molding surfaces having a general contour similar to the contour of said concave molding surfaces, said convex molding surfaces extending upward into the space defined by said concave molding surfaces when said pattern is reciprocated upward into contact with said blowhead, the distance between said concave and convex surfaces when said pattern is in its upper position being equal to the thickness of the thin-walled shell mold which is formed between said surfaces after the sand in said mold has been bonded by said resin, and a plurality of vents extending from said mold-defining cavity through said blowhead to the atmosphere to permit the escape of air displaced from said cavity by said mixture.

4. In a machine for forming thin-walled shell molds, the combination of a magazine for containing a molding mixture comprising sand and a thermosetting binder for said sand, an unheated metal blowhead having inwardly extending molding surfaces connected to the outlet end of said magazine, a heated metal pattern provided with outwardly extending molding surfaces having the same general contour as said inwardly extending molding surfaces located adjacent said blowhead, means for moving said pattern and said blowhead into proximity to one another to define a mold cavity therebetween, a passage through said blowhead adjacent the periphery of said cavity for circulation of a fluid coolant therethrough, a plurality of laterally spaced blow tubes extending from said magazine through said blowhead into said cavity for conveying said molding mixture thereto, means for admitting air under pressure into said magazine to force said mixture through said blow tubes and into said mold cavity, said blowhead being provided with a plurality of vents extending therethrough to permit the escape of air displaced from said cavity by said molding mixture, said outwardly extending molding surfaces projecting into the space defined by said inwardly extending molding surfaces when said pattern and said blowhead are moved into proximity to one another, the distance between said outwardly extending molding surfaces and said inwardly extending molding surfaces when said pattern and blowhead are in such proximity not exceeding the thickness of the thin-walled shell mold which is formed between said surfaces after the sand particles in said mold have been substantially all bonded together by said resin, and means for aligning said pattern with said blowhead when said pattern and blowhead are moved into proximity to one another.

5. In a machine for forming thin-walled shell-type sand-resin molds, the combination of a magazine provided with an opening for admitting into said magazine a dry molding mixture of sand particles and a thermosetting resin binder for said sand particles, a generally horizontally extending unheated metal blowhead plate connected to and spatially separated from the bottom of said magazine, a vertically reciprocable pattern rest table located beneath said blowhead plate, a generally horizontally extending heated metal pattern plate positioned on said table and reciprocable upward therewith into proximity to the blowhead plate to define an interjacent mold-defining cavity therewith, the bottom of said blowhead plate having concave mold-defining surfaces, the top of said heated pattern being provided with convex mold-defining surfaces having the same general contour as said concave mold-defining surfaces, a passage extending through said blowhead plate adjacent the periphery of said cavity for containing and circulating a fluid coolant, a plurality of laterally spaced blow tubes extending generally vertically from said magazine through said blowhead plate to said mold-defining cavity for conveying said molding mixture thereto, means for admitting air under pressure into said magazine to force said mixture through said blow tubes and into said cavity, said blowhead plate being provided with a plurality of vents extending from said cavity to the atmosphere to permit the escape of air displaced from said cavity by said molding mixture, said convex mold-defining surfaces extending upward into the space defined by said concave mold-defining surfaces when said pattern is reciprocated upward into mold-forming position adjacent the bottom of said blowhead, the distance between said concave and convex surfaces when said blowhead plate and said pattern plate are in said mold-forming position being equal to the thickness of the thin-walled shell mold which is formed between said surfaces after the sand particles in said mold have been substantially all bonded together by resin which has melted due to the heat of said pattern plate, and means for aligning said pattern plate with said blowhead plate when said pattern plate is reciprocated upward into said mold-forming position.

6. A method of forming a shell mold which comprises feeding a molding mixture containing sand and a thermosetting binder into a magazine having attached to its outlet end an unheated blowhead provided with concave molding surfaces, moving a heated pattern having convex molding surfaces of the same general contour as said concave molding surfaces into proximity to said blowhead so as to form a shallow mold cavity between said molding surfaces, forcing said molding mixture by compressed air from said magazine through said blowhead and into said cavity so as to fully occupy said cavity, permitting the molding mixture to remain in said cavity for a period of time sufficient to melt said binder and bond said sand into a solid shell mold having walls with a thickness equal to the distance between said concave and convex molding surfaces, thereafter moving said heated pattern from the vicinity of said blowhead and stripping said shell mold from said pattern.

7. A method of forming a thin-walled shell mold which comprises feeding a molding mixture comprising sand and a thermosetting resin binder into a magazine, placing a heated metal pattern having convex molding surfaces on a reciprocable table beneath a fluid-cooled metal blowhead attached to said magazine, said blowhead being provided with concave molding surfaces having the same general contour as said convex molding surfaces, vertically reciprocating said table and heated pattern upward so that upper surfaces of said pattern contact lower surfaces of said blowhead and said convex surfaces extend upwardly into the space defined by said concave surfaces a distance sufficient to form a shallow mold-defining cavity between said surfaces, forcing said molding mixture by compressed air from said magazine into said cavity through blow tubes in said blowhead so as to fully occupy said cavity with said mixture, retaining said pattern and blowhead in contact for a period of time sufficient to melt said binder and bond substantially all the sand particles together into a solid thin-walled shell mold having walls with a thickness equal to the distance between said convex and concave molding surfaces, thereafter lowering said table so that said heated pattern with said shell mold adhering thereto is brought out of contact with said blowhead, and subsequently curing said shell mold by further heating the same while in contact with said pattern and stripping said mold from said pattern.

References Cited in the file of this patent

UNITED STATES PATENTS

| 2,049,732 | Blake | Aug. 4, 1936 |
| 2,112,910 | Jeffery | Apr. 5, 1938 |
| 2,156,523 | Campbell | May 2, 1939 |
| 2,169,279 | Oyster | Aug. 15, 1939 |
| 2,191,451 | Campbell | Feb. 27, 1940 |
| 2,259,768 | Naylor | Oct. 21, 1941 |
| 2,449,136 | Pattison | Sept. 14, 1948 |
| 2,630,608 | Granath | Mar. 10, 1953 |
| 2,636,230 | Morton | Apr. 28, 1953 |
| 2,637,881 | Peterson | May 12, 1953 |

FOREIGN PATENTS

| 883,561 | France | Mar. 29, 1943 |

OTHER REFERENCES

Fiat Final Report, No. 1168, 4 pages.
The Foundry, October 1950, vol. 78, issue No. 10, pages 162, 164, and 168.